United States Patent [19]

Hood et al.

[11] Patent Number: 5,296,558
[45] Date of Patent: Mar. 22, 1994

[54] POLYMERIC COMPOSITION

[75] Inventors: Kathleen A. Hood, Swindon; Stephen Day, NR Swindon; Richard J. Penneck, Lechlade, all of Great Britain

[73] Assignee: Raychem Limited, London, England

[21] Appl. No.: 102,679

[22] PCT Filed: May 5, 1989

[86] PCT No.: PCT/GB89/00477
§ 371 Date: Nov. 2, 1990
§ 102(e) Date: Nov. 2, 1990

[87] PCT. Pub. No.: WO89/10948
PCT Pub. Date: Nov. 16, 1989

Related U.S. Application Data

[63] Continuation of Ser. No. 602,263, Nov. 2, 1990, abandoned.

[30] Foreign Application Priority Data

May 5, 1988 [GB] United Kingdom ............... 8810645
Nov. 18, 1988 [GB] United Kingdom ............... 8826998

[51] Int. Cl.$^5$ .............................................. C08L 77/00
[52] U.S. Cl. .................................. 525/425; 525/432; 525/436
[58] Field of Search .................. 525/425, 432, 436

[56] References Cited

U.S. PATENT DOCUMENTS 4,612,353  9/1986  Andrews et al. ................ 525/432
4,657,987  4/1987  Rock et al. ........................ 525/43

FOREIGN PATENT DOCUMENTS 0104659   4/1984  European Pat. Off. .
44-12593  6/1969  Japan ................................ 525/432
45-11834  4/1970  Japan ................................ 525/437
58-53949  3/1983  Japan ................................ 525/432
8403894  10/1984 World Int. Prop. O. ......... 525/432

Primary Examiner—Ana L. Carrillo
Attorney, Agent, or Firm—Herbert G. Burkard; Timothy H. P. Richardson; Sheri M. Novack

[57] ABSTRACT

A polymeric composition comprises:
(i) an aromatic polyimide or an aromatic carboxylic ester polymer,
(ii) a substantially wholly aliphatic polyamide, and
(iii) a polyamide that contains both aromatic aliphatic moieties.

It is found that the mechanical properties of blends of the aromatic polymers (i) and the polyamides (iii) can be significantly improved by the incorporation of a quantity of the aliphatic amides (ii), even though the miscibility of polymers, as observed by their glass transition temperatures may remain unchanged.

16 Claims, No Drawings

POLYMERIC COMPOSITION

This application is a continuation of application Ser. No. 07/602,263, filed Nov. 2, 1990, now abandoned.

This invention relates to polymeric compositions that include aromatic polymers and to electrical wires or other articles that employ such compositions.

Insulation materials, for example those that are used for electrical wires, need to exhibit a number of desirable physical properties. For example they should have moderate to good electrical resistivity depending on whether they are used as primary jackets or primary insulation, and they should exhibit good mechanical properties for example good scrape abrasion resistance and cut through resistance. In addition, for many applications for example in the case of airframe wire, the insulation should exhibit good arcing and tracking resistance.

Tracking is a phenomenon associated with the formation of permanent and progressive conducting paths on the surface of the material by the combined effects of an electrical field and external surface pollution. Once commenced, the carbonaceous conducting deposits often extend quickly in dendritic fashion to give a characteristic "tree" pattern until failure occurs across the surface. Electrical tracking can occur when a damaged energised bundle of wires become wet e.g. from electrolytes or condensation. This tracking may lead to flashover and arcing that causes additional wires in the bundle to become damaged. A catastrophic cascade failure can result from a fault to a single wire if adjacent wires that are at a different electrical potential are also susceptible to tracking or if the bundle is in contact with a grounded structure. Tracking can occur at low voltages e.g. 100V a.c. or less but becomes less likely as the voltage is reduced.

A related phenomenon, to which a number of polymers are also highly susceptible, is that of breakdown due to arcing. In this case a potential difference between two conductors, or between a conductor in which the insulation has been mechanically damaged, and ground, can result in the formation of an arc between the conductors or between the conductor and ground. The high temperature of the arc causes the polymer to degrade extremely rapidly and form an electrically conductive carbonaceous deposit which can extend rapidly, as with wet tracking, and lead to catastrophic failure in which many or all of the wires in a bundle are destroyed. Arcing can occur at very low voltages, for example 24V d.c. or lower, and since, unlike tracking, no electrolyte or moisture is involved, it is a particularly hazardous phenomenon. Arcs may also be struck by drawing apart two conductors between which a current is passing as described for example by J. M. Somerville "The Electric Arc", Methuen 1959.

A number of highly aromatic polymers have been proposed in recent years for use as electrical insulation, these polymers exhibiting good mechanical properties especially at high temperatures, which is at least partly due to their relatively high glass transition temperatures, e.g. of at least 100° C. However we have observed that such polymers are particularly susceptible to the tracking and arcing phenomena described above. In order to overcome, or at least reduce, the propensity of the polymers to track and to arc, we have proposed in International patent application No. WO 89/00756 blending the aromatic polymer with an aliphatic polymer. Although significant improvements in tracking and arcing performance have been obtained, this has been at some cost to the mechanical properties of the aromatic polymer especially at high temperatures. Furthermore, when the aliphatic polymer is replaced with a polymer, e.g. a polyamide, having both aromatic and aliphatic moieties and a relatively high glass transition temperature in order to improve the high temperature performance of the composition, instead of the mechanical properties of the blend being improved, we have found that certain properties are dramatically reduced, at least when the composition is extruded onto a wire, due to incompatibility of the polymers. This incompatibility is manifested in poor mechanical properties such as low ultimate elongation and flexibility of the extruded wire insulation.

According to the present invention, there is provided a polymer composition which comprises:
i) an aromatic polyimide or carboxylic ester polymer,
ii) a substantially wholly aliphatic polyamide, and,
iii) a polyamide that contains both aromatic and aliphatic moieties.

The present invention is based at least in part on our surprising observation that the compatability of the blend as evidenced by its mechanical properties can be significantly improved by the incorporation of a quantity of an aliphatic polyamide, even though the miscibility of the polymers, as observed by their glass transition temperatures, may be unchanged, (the term "compatability" being used herein in a general sense to describe the ability of the polymers to interact without necessarily forming a single phase, while the term "miscibility" being used to refer to systems having or approaching a single phase). In this way it is possible to obtain a polymer composition having relatively good high temperature mechanical properties such as resistance to cut through associated with highly aromatic polymers and with acceptable resistance to tracking and arcing. The reason why the aliphatic polyamide appears to compatibilise the aromatic polymer and the aromatic/aliphatic polyamide is not understood, especially in view of the chemical dissimilarity between it and the aromatic polymer. As indicated above, the compatibility of the polymers may be judged by the elongation to break of at least 50% and especially at least 100% since materials having elongations to break significantly less than 50% cannot be considered to be suitable for purposes such as extruded wire insulation.

Normally the aromatic polymer will be amorphous and will have a glass transition temperature of at least 140° C. e.g., from 160° to 250° C. Preferably it has not more than three, more preferably not more than two, and especially not more than one aliphatic backbone carbon atoms (that is to say, excluding any pendant carbon atoms) per repeat unit, and also preferably has no two adjacent carbon atoms in the polymer backbone. Preferably it has no more than seven, and especially not more than three aliphatic carbon atoms in total, i.e., including any pendant groups. The aromatic polymer is preferably a melt-processable polyimide, and especially a polyetherimide. Preferred aromatic polymers are those having the general repeat unit I:

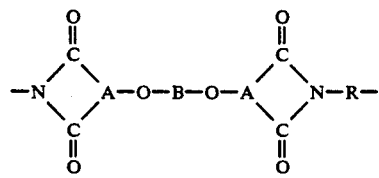

in which

A represents a single or fused double membered aromatic group which is unsubstituted or substituted by one or more alkyl or alkoxy groups;

B represents an unsubstitutes or substituted arylene group that has one or more aromatic rings and which may include an alkylene moiety; and R represents a divalent aromatic or aliphatic group which may be unsubstituted or substituted.

Preferably the aromatic polymer has the general repeat unit II.

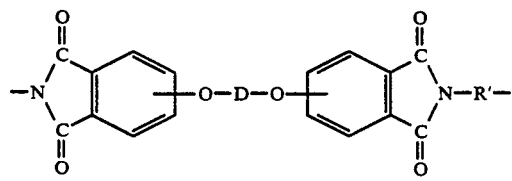

in which D represents a group of the formula:

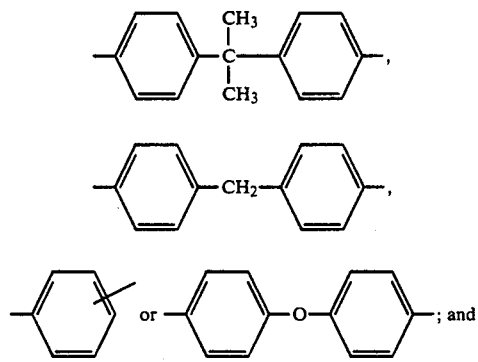

R' represents an arylene group.

The preferred aromatic polymer has the repeat unit:

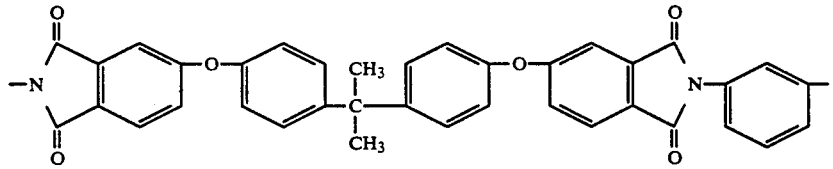

These polymers and their production are described in U.S. Pat. Nos. 3,847,867, 3,847,869, 3,850,885, 3,852,242 and 3,855,178, the disclosures of which are incorporated herein by reference.

Alternatively, the aromatic may comprise a carboxylic ester or "polyarylate". Polyarylates that may be used include those that are derived from dihydric phenols and at least one aromatic dicarboxylic acid. Examples of such polymers include those derived from a dihydric phenol of the general formula

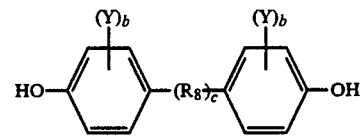

in which the groups Y, which may be the same or different, each represent a hydrogen atom, a $C_1$ to $C_4$ alkyl group, or a chlorine or bromine atom; b is 0 or an integer from 1 to 4; $R_8$ represents a divalent saturated or unsaturated hyrdocarbon group, e.g. an alkylene, alkylidine, cycloalkylene or cycloalkylidine group, an oxygen or sulphur atom or a carbonyl or sulphonyl group; and c is 0 or 1.

The preferred polyarylate has the repeat unit:

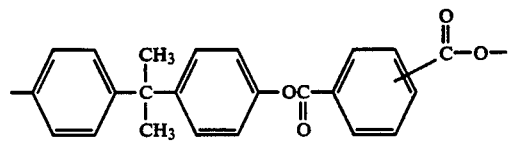

The aromatic/aliphatic polyamide is preferably amorphous and preferably has a glass transition temperature of at least 100° C., more preferably at least 130° C. and especially at least 150° C., but usually not more than 200° C. Preferably the polymer includes aromatic units that are derived from an unsubstituted or substituted phthalic acid. The preferred polyamide has units derived from laurinlactam, isophthalic acid and bis-(4-amino-3-methlcycloeexyl) methane. This polymer has a glass transition temperature of 155° C.

The aliphatic polyamide and the aromatic/aliphatic polyamide preferably have solubility parameters that differ by no more than 2.5, more preferably no more than 2.0 and especially by no more than 1.7 $(kJl^{-1})^{\frac{1}{2}}$. The solubility parameter quoted herein is defined as in the Polymer Handbook vol IV pages 337 to 359 edited by Brandrup & Immergut and published by John Wiley & Sons, in which methods for the determination thereof are described. The preferred method for determining the solubility parameter is to cross-link a sample of the polymer lightly if this is possible, and to immerse specimens of the polymer in a range of solvents of defined solubility parameters, the solubility parameter of the polymer being equal to that of the solvent in which maximum swelling of the polymer occurred. In the tests, strongly hydrogen-bonded solvents should be used.

The aliphatic polyamide which may be crystalline, semi-crystalline or amorphous, will normally have a chemical structure consisting of an alkylene group, or more than one different alkylene group separated by amide groups, the alkylene groups normally being unsubstituted and straight-chain. Preferably the alkylene groups have an average of at least 4 carbon atoms, more preferably at least 8 carbon atoms in the alkylene groups, but usually not more than 15 carbon atoms. In many cases, but not all, it is preferred for the aromatic/aliphatic polyamide to have alkylene groups of the same or similar length as those of the aliphatic polyamide (whether or not it contains any alkylene groups of dissimilar length to those of the aliphatic polyamide), since it is believed that this will improve the compatibility of the two polyamides. Thus the aromatic/aliphatic polyamide preferably contains an alkylene group that differs in length from that of an alkylene group in the aliphatic polyamide by not more than 3, more preferably not more than 2, especially not more than 1 carbon atoms and in the most preferred case are of exactly the same length. Particularly preferred aliphatic polyamides for use in the invention include nylon 12, nylon 12,12, nylon 6,12, nylon 6,10, nylon 6, nylon 6,6 and nylon 11.

The compositions preferably contain at least 10%, more preferably at least 20% and especially at least 30% of the aromatic polymer but usually not more than 60% and more preferably not more than 50% of the aromatic polymer. Too high a proportion of aromatic polymer will lead to poor tracking performance while the flammability may increase and mechanical properties suffer if the proportion of aromatic polymer is reduced to too low a level. The composition preferably contains at least 10%, more preferably at least 20%, especially at least 30% aromatic/aliphatic polyamide, but usually not more than 75%, preferably not more than 70% and especially not more than 60% of the aromatic/aliphatic polyamide. Significantly improved mechanical properties may be observed in some compositions even at very low aliphatic polyamide levels, e.g. as low as 2%. However, the aliphatic polyamide level is preferably at least 5%, and more preferably at least 7% and especially at least 10% in order to improve the compatibility of the blend. There is no clear maximum value for the aliphatic polyamide content, although levels of not more than 60%, and especially not more than 50% are preferred since at very high aliphatic polyamide levels the high temperature mechanical properties of the composition suffer due to the relatively low glass transition temperature of the polyamide. Since the incorporation of the aliphatic polyamide is principally to improve the compatibility of the other two components, levels of not more than 30% and especially not more than 20% are normally used in the case of wire insulation, although for other applications higher levels may be appropriate. All percentage values quoted herein are by weight and are based on the total weight of the aromatic polymer and the polyamides.

Preferably the polymeric composition according to the invention is cross-linked. In addition to the reduction in the tracking and arcing of the polymer blends, we have observed that at least some of the polymeric blends used in the present invention exhibit significantly a reduced tendency to erode when they have been cross-linked. Erosion is a phenomenon in which insulating material is removed by a vaporization process originated by an electrical discharge without the formation of electrically conductive deposits, so that failure of the insulation will not occur until complete puncture of the insulation occurs. The idealised concept does not always occur in practice, and many materials may exhibit both tracking and erosion. The two phenomena are distinguished from each other in that tracking (and arcing) are phenomena which produce a conducting char, often with little volume change in the insulation, whereas pure erosion can generate significant volume changes in the insulation with no conducting char, and may be tested for by determining the change in weight of the insulation.

Although the polymeric blend is described as being crosslinked, this does not mean that both or all components of the blend are crosslinked or crosslinked to the same extent. In general the aromatic polymer will exhibit a lower degree of crosslinking than the aromatic/aliphatic polyamide or the aliphatic polyamide, and in many cases the aliphatic polyamide may be highly crosslinked while the aromatic polymer remains substantially uncrosslinked.

The polymeric composition may be cross-linked, for example, by exposure to high energy radiation such as an electron beam or gamma-rays. Radiation dosages in the range 20 to 800 kGy, preferably 20 to 500 kGy, e.g. 20 to 200 kGy and particularly 40 to 120 kGy are in general appropriate depending on the characteristics of the polymer in question. For the purposes of promoting cross-linking during irradiation, preferably from 0.2 to 15 weight per cent of a prorad such as a polyfunctional vinyl or allyl compound, for example, triallyl cyanurate, triallyl isocyanurate (TAIC), methylene bis acrylamide, metaphenylene diamine bis maleimide or other crosslinking agents, for example as described in U.S. Pat. Nos. 4,121,001 and 4,176,027, are incorporated into the composition prior to irradiation.

The polymeric composition may include additional additives, for example reinforcing or non-reinforcing fillers, stabilisers such as ultra-violet stabilisers, antioxidants, acid acceptors and anti-hydrolysis stabilisers, pigments, processing aids such as plasticizers, halogenated or non-halogenated flame retardants, fungicides and the like.

The composition according to the invention is particularly suitable as electrical insulation, for example as cable and harness jacketting, sleeves for protecting solder and crimp electrical connections, and especially as electrical wire, e.g. equipment wire or so-called "hook-up" wire, airframe wire, or primary wires that are used in other military and commercial fields. In many instances the wire may have only a single insulating layer. However it is possible, and often desirable for it to include one or more additional layers that are provided for other reasons. Thus, for example, the composition described herein may be employed in a dual-wall construction as a primary jacket on top of a primary insulation that comprises an aliphatic polymer, or an aromatic/aliphatic blend, e.g. one described in International application No. WO 89/00756. The polymer blend may, if desired, be employed on top of an inorganic arc control layer for example formed by a vacuum deposition process. Alternatively the layer may be used as a primary insulation with an aromatic or non-aromatic primary jacket on top of the layer. It is possible for compositions according to the invention to be used for both the primary jacket and the primary insulation. Additional layers may be provided in constructions having three or more layers if appropriate.

One construction of particular interest is the use of the composition according to the invention as a primary insulation, and a fluoropolymer as the primary jacket. Preferably the fluoropolymer contains at least 10%, more preferably at least 25% fluorine by weight. The fluorinated polymer may be a single fluorine containing polymer or a mixture of polymers one or more of which contains fluorine. The fluorinated polymers are usually homo- or copolymers of one or more fluorinated, often perfluorinated, olefinically unsaturated monomers or copolymers of such a comonomer with a non-fluorinated olefin. The fluorinated polymer preferably has a melting point of at least 150° C., often at least 250° C. and often up to 350° C., and a viscosity (before any crosslinking) of less than $10^4$ Pa.s at a temperature of not more than 60° C. above its melting point. Preferred fluorinated polymers are homo- or copolymers of tetrafluoroethylene, vinylidine fluoride or hexafluoropropylene, and especially ethylene/tetrafluoroethylene copolymers e.g. containing 35 to 60% ethylene, 35 to 60% tetrafluoroethylene by mole and up to 10 by mole of other comonomers, polyvinylidine fluoride, copolymers of vinylidine fluoride with hexafluoropropylene, tetrafluoroethylene and/or hexafluoroisobutylene, polyhexafluoropropylene, and copolymers of hexafluoropropylene and tetrafluoroethylene. Alternatively $C_1$–$C_5$ perfluoroalkoxy substituted perfluoroethylene homopolymers and copolymers with the above fluorinated polymers may be used.

The wires and cables according to the invention may be formed by conventional techniques. For example the polymers may be blended together in a mixer, together with any additional components, pelletised, and then extruded onto a wire conductor. Other wires may be formed by a tape-wrapping method. However, it is preferred for the polymers used in the invention to be melt-shapeable so that the wire insulation can be formed by extrusion.

The wires may be used individually as equipment or "hook-up" wires, or airframe wires, or in bundles and harnesses, both jacketted and unjacketted, and may be used in multiconductor cables. The wires, harnesses or cables may be unscreened or they may be provided with a screen to protect them from electromagnetic interference, as well known in the art. In addition flat cables may be formed using the insulation materials according to the invention, either employing flat conductors or round conductors.

In addition to the manufacture of electrical wires, the compositions according to the present invention may be used in the manufacture of other melt-fabricated articles for example extruded articles or articles that are formed by moulding operations such as injection, transfer or blow moulding. For example the compositions may be used to form dimensionally recoverable articles e.g. in tubular form. Dimensionally recoverable articles are articles that have a dimensional configuration that can be caused substantially to change when subjected to appropriate treatment. Of particular interest are heat-recoverable articles, which may be made to recover on heating towards an original shape by a heat-treatment. For example an extruded tube that is radially heat-recoverable may be recovered over a bundle of primary wires to form a jacket in the production of a cable harness. Such articles and their production are described in U.S. Pat. Nos. 2,027,962, 3,086,242 and 3,597,372, the disclosures of which are incorporated herein by reference.

Other extruded articles that may be formed from the composition according to the invention include rigid, semi-rigid or flexible self-supporting hollow articles such as conduits. Such conduits may be used for the supply of fluids or they may be used to house electrical wiring, pipes or other utilities for buildings or for commercial or military automotive vehicles vessels or aircraft. The conduit may have virtually any size e.g. from 1 cm to 1 m or more and a wall thickness e.g. in the range of from 1 mm to 1 cm. The conduit may be extruded or it may be provided with a non-uniform profile, for example it may be corrugated having circumferentially extending corrugations in order to increase the crush resistance of the conduit while increasing its axial flexibility.

The following Examples illustrate the invention. The solubility parameters quoted were determined by the method described in the Pethrick reference above using Fedors's parameters. In the Examples the following test procedures were used.

CHAR RESIDUE

The char residue of the polymer components were measured by thermogravimetric analysis, or TGA, in which a sample of the polymer is heated in nitrogen or other inert atmosphere at a defined rate to a defined temperature and the residual weight, which is composed of char, is recorded. The char residue is the quantity of this residual char expressed as a percentage of the initial polymer after having taken into account any non polymeric volatile or non-volatile components. The char residue values quoted are defined as having been measured at 850° C. and with a heating rate of 10° C. per minute.

CTI Test

This method is a modification of IEC 112 which measures the low voltage track resistance (up to 600V) as Comparative Tracking Index (CTI) of materials in the presence of an aqueous contaminant.

The samples are prepared by extruding tapes of the required composition approximately 0.5 mm thick and of sufficient width to ensure that during the test no liquid flows over the edge of the sample. Before testing, the surface of the sample is cleaned with methanol to remove any surface contamination.

The test apparatus is as described in IEC 112. It consists of two platinum electrodes, each with one end chisel-shaped to an angle of 30 degrees. The electrodes are symmetrically arranged such that the opposing chisel faces are vertical and 4.0±0.1 mm apart when placed on the surface of the specimen.

The power supply consists of a 0.5 kVA transformer capable of supplying an a.c. voltage in the range 100–600V at 50Hz. A rheostat is incorporated into the circuit so that the short circuit current may be adjusted to give 1.0±0.1 amp. An over-current relay is provided which shuts off the HV supply when a current of at least 0.5 amps flows for 2 seconds, the criteria for failure.

A device for dropping electrolyte solution between the electrodes is provided. This consists of a peristaltic pump which draws liquid from a reservoir and pumps it out of a needle situated at height of 30–40 mm above and between the electrodes. The dropping rate is set to 1 drop every 30±5 seconds with a drop volume of 20±3 $mm^3$. Before the test, the needle is cleaned and purged with several drops of electrolyte to ensue the correct concentration of reagent is used.

The electrolyte solution used in these tests is 0.1±0.002% ammonium chloride and 0.01% sodium dodecyl sulphate surfactant in deionised water and has a resistivity of 405±5 ohm.cm at 23° C.

By using a surfactant, reproducible results have been obtained on homogeneous samples. However, the type of surfactant used can greatly affect the CTI values obtained. Sodium dodecyl sulphate was chosen as this gave a working range of below 150V (for known badly tracking materials) to above 600V for non-tracking materials.

Test Procedure

The specimen is put into position and the electrodes lowered on to the surface. A suitable voltage is chosen and the short circuit current adjusted accordingly. The electrolyte is then allowed to drop between the electrodes until either
a) tracking occurs
b) at 600V, the sample withstands 50 drops.

For those materials which track, the test is then repeated at at least three other voltages such that two voltages give results above 50 drops, and two give results below 50 drops. A curve of drops to failure versus applied voltage is plotted from which is read the voltage at which 50 drops would cause failure. This voltage is the comparative tracking index (CTI).

For those materials which withstand 50 drops at 600V, CTI is then quoted as >600 and the erosion rate of the sample is determined by measuring the thickness of the material and the time taken for the electrodes to penetrate through to the base at 400V. Erosion rate is then quoted as mm minute$^{-1}$.

EXAMPLE 1

A number of blends of a polyetherimide, an aromatic-/aliphatic polyamide and an aliphatic polyamide were dry blended and extruded as a 0.5 mm thick, 15 mm wide tape. The melt temperature varied depending on the composition between 267° C. (100% aromatic/aliphatic polyamide) to 350° C. (100% polyetherimide) and the die temperature in the extruder also varied depending on the composition from about 40° C. below, to about equal to the melt temperature.

The polyetherimide (ex. General Electric Co.) had the formula:

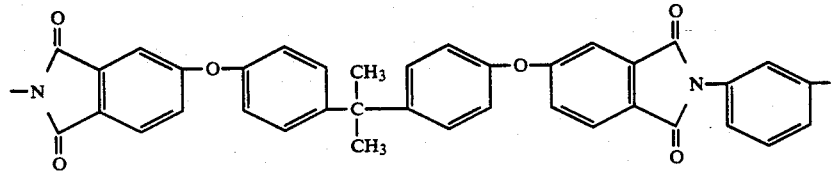

The aromatic/aliphatic polyamide was based on laurinlactam, bis(4-amino-3-methylcyclohexyl)methane and isophthalic acid (ex. EMS Chemie AG-Switzerland), and the aliphatic polyamide was nylon 12.

A number of different runs were performed in which the content of one component was increased while the weight ratio of the other two components was held constant at about 1:1. The results are shown in Table I. The same blends were extruded as a 0.1 mm thick insulation on a 20 AWG tin plated copper stranded conductor, and the tensile properties of the insulation were measured at 50 mm minute$^{-1}$ on an instron tester, and the results are shown in Table II. It can be seen that, while the blend of the polyetherimide and aromatic/aliphatic polyamide (run A) had a very poor ultimate elongation, the elongations of the blends that included nylon 12 were quite acceptable. The blends also exhibited considerably lower char residue values than were predicted from the values for the single components (runs G,O and X), together with relatively high CTI values.

EXAMPLE 2

Blends were formed from the same polyetherimide as in Example 1, and a range of aromatic/aliphatic polyamides and aliphatic polyamides under the same conditions as Example 1. The following polyamides were used:

| Run No. | Aromatic/Aliphatic Polyamide* | Aliphatic Polyamide |
| --- | --- | --- |
| A' | 1 | nylon 6 |
| B' | 1 | nylon 6,6 |
| C' | 1 | nylon 6,12 |
| D' | 2 | nylon 6 |
| E' | 2 | nylon 6,6 |
| F' | 2 | nylon 2 |
| G' | 2 | nylon 6,12 |

The results are shown in Table III.

EXAMPLE 3

A blend of the same polyamides as in Example 1 was formed with a polyarylate (ex. Amoco) having a repeat unit of the formula:

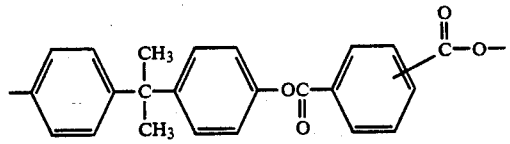

in which a mixture of tere- and isophthalic acid units are present. The results are shown in Table III (run H') together with those for control runs (I', J').

EXAMPLE 4 blends of the same polyether imide, aliphatic polyamide and aromatic/aliphatic polyamide as in Example 1 were blended in various proportions together with borminated flame retardant as follows:

| | K' | L' | M' |
| --- | --- | --- | --- |
| | (Parts by weight) | | |
| Polyetherimide | 40 | 40 | 40 |
| Nylon 12 | 25 | 40 | 50 |
| Aromatic/aliphatic polyamide | 35 | 20 | 10 |
| Flame retardant (Decabranodiphenyl ether) | 5 | 5 | 5 |
| Zinc Oxide | 2 | 2 | 2 |
| Hindered phenol/ antioxidant | 3 | 3 | 3 |
| Triallylisocyanurate | 5 | 5 | 5 |
| Antimony trioxide | 2.5 | 2.5 | 2.5 |

The blends were extruded in the form of tape, and their tensile properties are shown in Table IV.

TABLE I

| Run No. | % polyetherimide | % aromatic/ aliphatic polyamide | % aliphatic polyamide | Predicted char | Actual char | CTI | Erosion rate (mm/min) |
|---|---|---|---|---|---|---|---|
| A (Control) | 50 | 50 | 0 | 24 | | 189 | — |
| B | 45 | 45 | 10 | 22 | 16 | >600 | 0.066 |
| C | 35 | 35 | 30 | 17 | 9 | >600 | 0.047 |
| D | 25 | 25 | 50 | 12 | 4 | >600 | 0.038 |
| E | 15 | 15 | 70 | 7 | 2 | >600 | 0.026 |
| F | 5 | 5 | 90 | 2 | 3 | >600 | 0.023 |
| G (control) | 0 | 0 | 100 | — | 0 | >600 | <0.020 |
| H (control) | 50 | 0 | 50 | 24 | 8 | 195 | — |
| I | 45 | 10 | 45 | 22 | 7 | 270 | — |
| J | 35 | 30 | 35 | 17 | 8 | >600 | .060 |
| K | 30 | 40 | 30 | 14 | 7 | >600 | .050 |
| L | 25 | 50 | 25 | 12 | 2 | >600 | .060 |
| M | 15 | 70 | 15 | 7 | 0 | >600 | .035 |
| N | 5 | 90 | 5 | 2 | 0 | >600 | .010 |
| O (Control) | 0 | 100 | 0 | — | 0 | >600 | .005 |
| P (Control) | 0 | 50 | 50 | 0 | 0 | >600 | .007 |
| Q | 10 | 45 | 45 | 5 | 0 | >600 | .020 |
| R | 20 | 40 | 40 | 10 | 3 | >600 | .045 |
| S | 30 | 35 | 35 | 14 | 6 | >600 | .055 |
| T | 40 | 30 | 30 | 19 | 11 | >600 | .062 |
| U | 50 | 25 | 25 | 24 | 11 | 205 | — |
| V | 70 | 15 | 15 | 34 | 23 | 150 | — |
| W | 90 | 5 | 5 | 43 | 39 | <150 | — |
| X (Control) | 100 | 0 | 0 | — | 48 | <150 | — |
| Y | 40 | 50 | 10 | 19 | 12 | >600 | .043 |
| Z | 40 | 20 | 40 | 19 | 9 | >600 | .061 |

TABLE II

| Composition No. | % Polyetherimide | % aromatic/ aliphatic polyamide | % aliphatic polyamide | Ultimate elongation % | Tensile strength (MPa) |
|---|---|---|---|---|---|
| A | 50 | 50 | 0 | 2 | 61.0 |
| B(1) | 49 | 49 | 2 | 70 | 110 |
| B(2) | 47.5 | 47.5 | 5 | 94 | 108 |
| B | 45 | 45 | 10 | 143 | 107 |
| C | 35 | 35 | 30 | 207 | 94 |

TABLE III

| Run No. | % aromatic polymer | % aromatic/ aliphatic polyamide | % aliphatic polyamide | Ultimate elongation % | Tensile Strength (MPa) | Predicted char % | Actual char % |
|---|---|---|---|---|---|---|---|
| A' | 40 | 20 | 40 | 42 | 62.4 | 19 | 10 |
| B' | 40 | 20 | 40 | 25 | 53.5 | 19 | 8 |
| C' | 40 | 20 | 40 | 60 | 44.5 | 19 | 8 |
| D' | 40 | 20 | 40 | 122 | 51.8 | 19 | 12 |
| E' | 40 | 20 | 40 | 81 | 52.9 | 19 | 10 |
| F' | 40 | 20 | 40 | 29 | 53.8 | 19 | 10 |
| G' | 40 | 20 | 40 | 94 | 42.3 | 19 | 10 |
| H' | 40 | 20 | 40 | 123 | 48.4 | 11 | 2 |
| I' | 50 | 0 | 50 | 52 | 46.2 | 14 | 3 |
| J' | 50 | 50 | 0 | 35 | 54.0 | 14 | 5 |

TABLE IV

| Run No. | Ultimate Elongation (%) | Tensile Strength (MPa) |
|---|---|---|
| K' | 165 | 69.3 |
| L' | 142 | 84.0 |
| M' | 147 | 79.4 |

We claim:

1. A polymeric composition which comprises:
   (i) from 10 to 60% by weight of an aromatic polyimide or an aromatic carboxylic ester polymer,
   (ii) from 2 to 20% by weight of an aliphatic polyamide, and
   (iii) from 30 to 75% by weight of a polyamide that contains both aromatic and aliphatic moieties.

2. A composition as claimed in claim 1, in which the polyamide that contains both aromatic and aliphatic moieties has alkylene groups of the same length or carbon atom number as the aliphatic polyamide.

3. A composition as claimed in claim 1 wherein the aromatic polyimide or carboxylic ester polymer has not more than one aliphatic backbone carbon atom per repeat unit.

4. A composition as claimed in claim 1 wherein the aromatic polymer (i) has a glass transition temperature of at least 140° C.

5. A composition as claimed in claim 1, wherein the aromatic polymer (i) has the repeat unit:

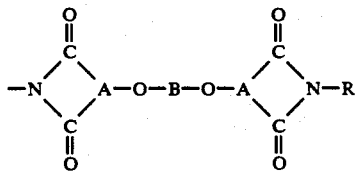

in which
- A represents a single or fused double membered aromatic group which is unsubstituted or substituted by one or more alkyl or alkoxy groups;
- B represents arylene group that has one or more aromatic rings and which may be substituted with an alkylene moiety; and
- R represents a divalent aromatic or aliphatic group.

6. A composition as claimed n claim 5, wherein the aromatic polymer has the general repeat unit:

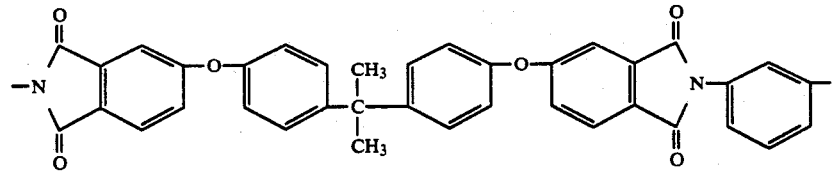

7. A composition as claimed in claim 1 wherein the aliphatic polyamide has an alkylene group containing at least 5 carbon atoms.

8. A composition as claimed in claim 1 wherein the aromatic polymer (i) has the repeat unit:

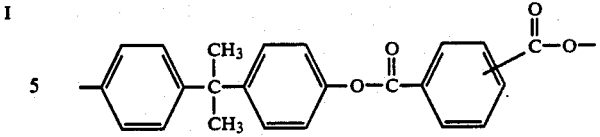

which contains a mixture of isophthalic and terephthalic acid units.

9. A composition as claimed in claim 8, wherein the aliphatic polyamide has an alkylene group containing 11 carbon atoms.

10. A composition as claimed in claim 1 wherein the aromatic/aliphatic polyamide includes units derived from a phthalic acid.

11. A composition as claimed in claim 1 wherein the aromatic/aliphatic polyamide has units derived from laurinlactam, isophthalic acid and bis-(4-amino-3-methylcyclohexyl)methane.

12. A composition as claimed in claim 1 wherein the aromatic/aliphatic polyamide has units derived from 2,2,4- and 2,4,4-trimethylhexamethylene diamine and terephthalic acid.

13. A composition as claimed in claim 1 which contains from 20% to 60% by weight of the aromatic polymer based on the total weight of the aromatic polymer and polyamides.

14. A composition as claimed in claim 1 which is crosslinked.

15. An extruded article that comprises a composition as claimed in claim 1.

16. A dimensionally recoverable article formed from a composition as claimed in claim 1.

* * * * *

UNITED STATES PATENT AND TRADEMARK OFFICE
CERTIFICATE OF CORRECTION

PATENT NO. : 5,296,558
DATED : March 22, 1994
INVENTOR(S) : Hood et al

It is certified that error appears in the above-indentified patent and that said Letters Patent is hereby corrected as shown below:

Column, 10, line 20, insert --*Polyamide 1 was the same as that used in Example 1.

Polyamide 2 was a polymer formed from a mixture of 2,2,4- and 2,4,4-trimethylhexamethylene diamine and terephthalic acid (ex. Dynamit Nobel).--

Signed and Sealed this

Twentieth Day of September, 1994

Attest:

BRUCE LEHMAN

Attesting Officer     Commissioner of Patents and Trademarks